United States Patent [19]
van Thoor et al.

[11] Patent Number: 5,190,652
[45] Date of Patent: Mar. 2, 1993

[54] FILTER HOLDER FOR COFFEE CARTRIDGES

[75] Inventors: Bernardus M. van Thoor, Maarssen; Jan C. van Hattem, Amerongen, both of Netherlands

[73] Assignee: Sara Lee/DE N.V., Utrecht, Netherlands

[21] Appl. No.: 761,291

[22] Filed: Sep. 17, 1991

[30] Foreign Application Priority Data

Sep. 21, 1990 [NL] Netherlands ............... 9002072

[51] Int. Cl.⁵ .......................................... B01D 29/085
[52] U.S. Cl. .................................. 210/474; 210/481; 210/482; 426/77; 426/82; 99/295
[58] Field of Search ............... 99/295; 426/77, 82; 210/473, 474, 477, 481, 482

[56] References Cited

U.S. PATENT DOCUMENTS

| 3,333,527 | 8/1967 | Bender | 99/283 |
| 4,056,050 | 11/1977 | Brown | 99/305 |
| 4,446,158 | 5/1984 | English et al. | 427/79 |
| 4,957,632 | 9/1990 | Bockstiegel et al. | 210/474 |
| 4,995,978 | 2/1991 | Van de Gang | 210/474 |
| 5,071,549 | 12/1991 | Hauslein | 210/474 |

FOREIGN PATENT DOCUMENTS

| 382871 | 10/1931 | Belgium . |
| 0271126 | 5/1987 | European Pat. Off. . |
| 1454097 | 11/1968 | Fed. Rep. of Germany . |
| 2111377 | 11/1981 | United Kingdom . |

OTHER PUBLICATIONS

Copy of European Search Report for Application No. 91 20 2459.

Primary Examiner—Robert A. Dawson
Assistant Examiner—W. L. Millard
Attorney, Agent, or Firm—Merchant, Gould, Smith, Edell, Welter & Schmidt

[57] ABSTRACT

A filter holder for coffee cartridges, comprising a cartridge-receiving portion (4) with a closed bottom and a lateral extract passage (9), a by-pass (5) which has its inlet (6) spaced above the cartridge-receiving portion (4) and terminates adjacent the extract passage (9), as well as an upper supporting rim (7) which is so inclined relative to the axis of the closed bottom, that when the filter pan is arranged by the supporting rim (7) thereof on the upper edge of a receptacle for brewed coffee, the outlets of the by-pass (5) and the extract passage (9) are disposed substantially at the lowest point.

4 Claims, 1 Drawing Sheet

FILTER HOLDER FOR COFFEE CARTRIDGES

This invention relates to the brewing of coffee using a filter holder and a filter cartridge, whereby a part of the water flows through the coffee contained in the cartridge and another part of the water freely flows past the cartridge.

In such a method of making coffee as known from U.S. Pat. No. 4,446,158, use is made of a filter holder whose bottom not only comprises an aperture for receiving a filter cartridge but also a free passage for the water poured into the holder. This means there is a continuous flow of unfiltered water from the filter holder into a cup arranged under the holder, so that also in the case of normal and small water-coffee ratios, dilution of the brew occurs at a time when not all constituents have been extracted from the coffee yet. The object of the invention is to remove this drawback.

To that end, the filter holder according to the invention comprises a cartridge-receiving portion with a closed bottom and a lateral extract passage, a by-pass which has its inlet spaced above the cartridge-receiving portion and terminates adjacent the extract passage, as well as an upper supporting rim which is so inclined relative to the axis of the closed bottom that when the filter pan is arranged by the supporting rim thereof on the upper edge of a receptacle for brewed coffee, the outlets of the by-pass and the extract passage are disposed substantially at the lowest point. With the filter holder according to the invention, it is ensured that always a minimum amount of water passes through the filter cartridge, independently of the water supply rate, and a cup of coffee of a minimum strength is guaranteed.

By supplying the water off the centre, i.e. not along the axis of the filter holder but in a direction towards the lowest part of the inclined cartridge, it is ensured that a part of the top of the filter cartridge remains dry as long as possible, so that at the beginning of the percolation cycle the gases escaping from the coffee contained in the filter cartridge during extraction can still be readily discharged via the part that remains dry. The point is that it has been found that wet filter material is impermeable to gases.

Owing to the fact that the by-pass inlet is disposed above the top surface of a support shoulder for the filter cartridge, it is at all times ensured that a part of the water that is being supplied will flow through the filter cartridge, i.e. with extraction. Only when the continued supply of water causes the water in the filter pan to rise to a level above the by-pass inlet, will water flow through the above-mentioned by-pass without filtration of the coffee present in the filter cartridge.

Owing to the filter holder being formed with an extract passage adjacent the by-pass and the bottom of the filter holder being closed, the coffee filtrate and the water drained via the by-pass leave the filter holder at the same point, so that a proper mixture thereof is accomplished and, moreover, the fluid flowing from the filter holder can be identified as coffee rather than water.

Owing to the supporting rim of the holder being disposed at an angle deviating from 90° relative to the axis of the filter pan, the desired inclined position of the coffee filter is automatically obtained when the filter holder is placed on a mug or a similar coffee receptacle.

The overflow or by-pass is provided on the "longer" side of the filter pan, so that it is ensured that all fluid leaves the filter pan at the lowest point.

For easy handling of the filter pan, the supporting rim may be fitted with a gripping lug. This gripping lug is preferably disposed approximately diametrically opposite the by-pass aperture.

For the sake of completeness, it is noted that it is known from European patent application 0,271,126 to arrange a filter cartridge at an angle in a filter pan. According to this publication, the object thus realized is for the foam that is being formed during brewing to gather in the highest part. However, this means that hardly any fluid is discharged via the portion filled with foam.

Further, it is known per se from German Offenlegungsschrift 1,454,097 to use in a coffee making apparatus a by-pass having its outlet is disposed at a higher level than a receiving space for ground coffee at the bottom of a water receptacle. In this percolator the by-pass has a different function, namely to prevent the apparatus from overflowing when the heating element is not switched off timely.

To further explain the invention, one embodiment of the filter holder will now be described, by way of example, with reference to the accompanying drawings, in which.

Figure 1:
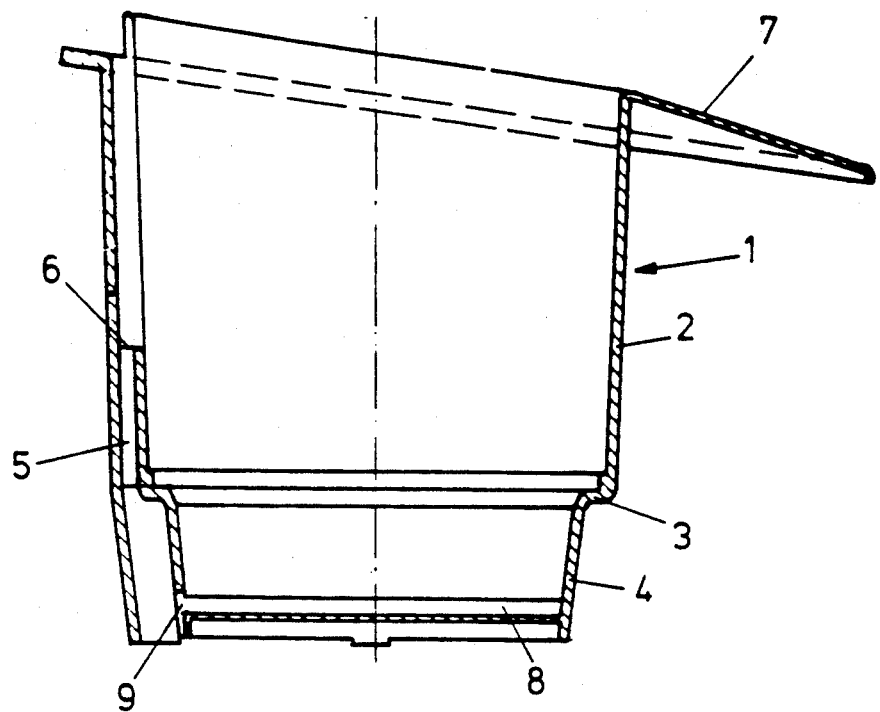
FIG. 1 is a longitudinal section of a filter holder for making coffee.
Figure 2:
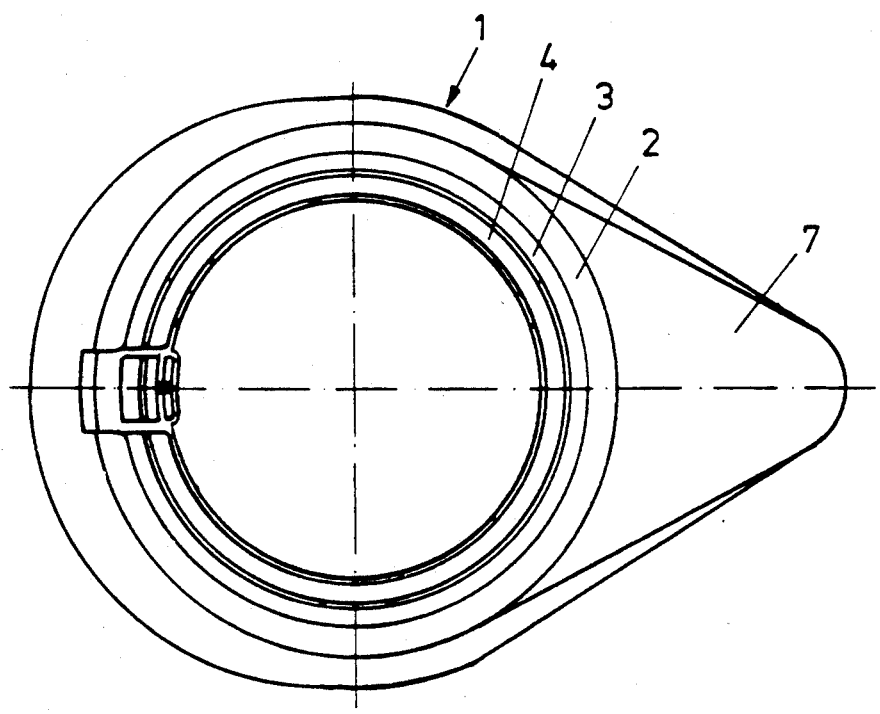
FIG. 2 is a bottom view of the holder according to FIG. 1.

Referring to the drawings, there is shown a filter holder for making coffee using coffee cartridges, comprising a housing 1 with a substantially vertical wall portion 2. Via a shoulder-shaped portion 3, the substantially vertical wall portion 2 is adjoined at the lower end thereof by a filter cartridge-receiving portion 4, which is closed at the bottom and comprises a reinforcement rib 8.

A filter cartridge suitable for cooperation with such a filter is known per se and therefore not shown. In use, the circumferential collar of such a filter cartridge rests on the shoulder-shaped portion 3, while the filter itself is disposed in the filter cartridge-receiving portion 4, which is slightly tapered, i.e. adapted to the filter cartridge. For the discharge of filtrate, an extract discharge aperture 9 is provided in the sidewall adjacent the bottom.

As appears from the drawing, the filter comprises on one side thereof, in this case the left-hand side, a by-pass 5 having its inlet 6 disposed at a predetermined height above the shoulder-shaped portion 3. It is thus ensured that always a minimum amount of supplied fluid, in this case water, will flow through the filter cartridge.

Further, the substantially vertical wall 2 is provided at the top thereof with a holder supporting rim 7 by means of which the filter can be placed on a receptacle such as a cup. The supporting rim 7 is disposed at an angle deviating from 90° relative to the axis of the filter 1. It is thus ensured that when water is poured into the receptacle, the initial flow of water through the filter cartridge occurs on the left-hand side, which enables any gases that may still be released in the filter cartridge during filtration to escape via the "dry portion" on the right-hand side of the filter cartridge. The holder supporting rim is extended on one side to facilitate gripping.

Another advantage of this inclined position is that the brew, i.e. the filtrate and the by-pass water, leave the filter holder at the lowest point so that a thorough mixture of the water and the extract is obtained.

Tests have shown that inclining the filter too much results in an unbalanced extraction of the coffee. It has been found that an angle of 6–12°, preferably 9°, relative to the horizontal gives optimum results in respect of high-quality coffee, on the one hand, and of reduced brew time, on the other.

Depending on the rate at which the brewing water is supplied, the height of the by-pass point may vary. Thus, if a slower rate is employed, more brew will leave the filter at the lower end before this point is reached than when a faster rate of supply is used. In other words, in the case of a slower supply, the point of overflow may be lower.

What we claim is:

1. A filter holder for coffee cartridges, comprising a cartridge-receiving portion (4) with a closed bottom and a lateral extract passage (9), a by-pass (5) which has its inlet (6) spaced above the cartridge-receiving portion (4) and terminates adjacent the extract passage (9), as well as an upper supporting rim (7) which is so inclined relative to the axis of the closed bottom, that when the filter pan is arranged by the supporting rim (7) thereof on the upper edge of a receptacle for brewed coffee, outlets of the by-pass (5) and the extract passage (9) are disposed substantially at the lower point.

2. A device according to claim 1, characterized in that the supporting rim is fitted with a gripping lug.

3. A device according to claim 2, characterized in that the gripping lug is arranged approximately diametrically opposite the by-pass (5).

4. A filter holder for coffee cartridges, comprising a cartridge-receiving portion (4) with a closed bottom and a lateral extract passage (9), a by-pass (5) which has its inlet (6) spaced above the cartridge-receiving portion (4) and terminates adjacent the extract passage (9), as well as an upper supporting rim (7) which is so inclined at an angle of between 6° and 12° relative to the axis of the closed bottom, that when the filter pan is arranged by the supporting rim (7) thereof on the upper edge of a receptacle for brewed coffee, the outlets of the by-pass (5) and the extract passage (9) are disposed substantially at the lowest point.

* * * * *